(12) United States Patent
Gross

(10) Patent No.: US 6,896,289 B2
(45) Date of Patent: May 24, 2005

(54) HYDRAULICALLY OPERABLE LANDING GEAR

(76) Inventor: Larry A. Gross, 1248 North Rd., NE., Warren, OH (US) 44483

( * ) Notice: Subject to any disclaimer, the term of this patent is extended or adjusted under 35 U.S.C. 154(b) by 0 days.

(21) Appl. No.: 10/629,277

(22) Filed: Jul. 28, 2003

(65) Prior Publication Data

US 2005/0023798 A1 Feb. 3, 2005

(51) Int. Cl.$^7$ ................................................ B60S 9/06
(52) U.S. Cl. ................................ 280/766.1; 254/419
(58) Field of Search ............................. 280/767, 475; 254/419

(56) References Cited

U.S. PATENT DOCUMENTS

| | | | |
|---|---|---|---|
| 2,875,980 A | * | 3/1959 | Grace .......................... 254/419 |
| 3,077,120 A | * | 2/1963 | Viehweger, Jr. ............. 74/354 |
| 3,136,527 A | * | 6/1964 | Griffis ......................... 254/419 |
| 3,189,322 A | * | 6/1965 | Hadek ......................... 254/425 |
| 3,201,087 A | | 8/1965 | Dalton |
| 3,784,160 A | | 1/1974 | Phillips |
| 4,116,315 A | | 9/1978 | Vandenberg |
| 4,281,852 A | * | 8/1981 | Konkle ..................... 280/766.1 |
| 4,345,779 A | | 8/1982 | Busby |
| 4,466,637 A | | 8/1984 | Nelson |
| 5,004,267 A | | 4/1991 | Busby |
| 5,299,829 A | | 4/1994 | Rivers, Jr. et al. |

* cited by examiner

*Primary Examiner*—Kevin Hurley
(74) *Attorney, Agent, or Firm*—Sand & Sebolt

(57) ABSTRACT

A vertically adjustable landing gear system for a trailer includes a pair of vertically adjustable lifts, a hydraulic motor having a pair of rotational outputs and a pair of landing gear drive shafts, each rotationally engaging one of the respective lifts and one of the respective rotational outputs to vertically adjust the lifts. A relief valve relieves hydraulic pressure to allow manual operation of the lifts in case of hydraulic system failure. An alternate landing gear system includes a single landing gear drive shaft rotationally engaging the pair of lifts and a drive shaft engagement mechanism engaging the rotational outputs and the drive shaft to transfer rotational motion from the rotational output to the drive shaft.

24 Claims, 11 Drawing Sheets

US 6,896,289 B2

HYDRAULICALLY OPERABLE LANDING GEAR

BACKGROUND OF THE INVENTION

1. Technical Field

The present invention generally relates to landing gear for a trailer. More specifically, the invention relates to landing gear which is vertically adjustable by hydraulic power. Specifically, the invention relates to vertically adjustable landing gear driven by a dual output hydraulic motor which directly operates the transverse drive shaft which engages a mechanical lift mechanism in the lifts.

2. Background Information

Landing gear for trailers such as used with tractor trailers and the like have been known for many years. Various mechanisms have been utilized to raise and lower the landing gear, including jack screw or other threaded mechanisms, pneumatically powered mechanisms and hydraulically powered mechanisms which pump hydraulic fluid into telescoping piston-cylinder type legs to provide the lift mechanism. Most commonly, these landing gear are cranked by hand to make the vertical adjustment. U.S. Pat. No. 3,201,087 to Dalton discloses a landing gear having telescoping legs which are driven by a threaded member with the use of beveled gears translating motion from a transverse drive shaft. This patent shows both the use of a hand crank and motor power in order to make the vertical adjustment. U.S. Pat. No. 4,466,637 to Nelson also discloses a landing gear which is either operated manually or by a motor, in particular by an air motor. While it is assumed that each of these devices operates as described, each of them also requires a reduction gear box in order to function properly. By contrast, the present invention does not require such a reduction gear box, but instead directly drives the transverse shaft which engages the vertical lifts of the landing gear via beveled gears (such as disclosed in the Dalton patent) or otherwise in order to vertically adjust the lift.

U.S. Pat. No. 3,784,160 to Phillips discloses a system for raising and lower landing gear which uses an electric motor having an output shaft and a casing rotatable in opposite directions with respect to one another, the shaft and casing also being rotatable with respect to the vehicle with which they are used. The output shaft is connected to one drive shaft and the casing to another drive shaft so that the drive shafts rotate in opposite directions in accordance with the output shaft and casing to operate respective screw jacks. There are several disadvantages of this arrangement, wherein a motor is not mounted to the vehicle so that the casing is rotatable with respect to the vehicle. A "free-floating" motor precludes the use of hydraulic and other motors which must be stationary in order to receive the pressure/return lines. Thus, only a motor which can achieve this "free-floating" nature may be used. An electrical motor may be the only type which can function in this manner. The electric motor thus requires a brush assembly to simultaneously provide power and allow the casing to rotate. In addition, in order to provide the necessary torque to lift heavy loads, the motor would need to be of a substantial size and weight, inherently adding lateral stress to the drive shafts extending to the jacks and to the motor bearings supporting the output shafts, thus requiring drive shaft supports to indirectly support the weight of the motor and maintain alignment of the drives shafts and output shafts.

U.S. Pat. No. 4,345,779 to Busby discloses a pneumatically operated drive unit which drives a shaft via a nut attached to the end of the shaft, the pneumatic drive and nut being disposed laterally outside a pair of telescoping legs. One disadvantage of this arrangement is that the drive provides a pulsating drive which does not promote smooth operation which is highly desirable for vertically adjusting the landing gear. Another drawback of this system is the limit on the amount of pressurized air that can be maintained at sufficient pressure in mobile air reservoirs. In order to have sufficient air, the air reservoirs must be sufficiently large, which means a bulky reservoir that is impractical to carry on the vehicle. Where the reservoir is too small to completely adjust the landing gear, an air compressor must be used to provide the additional pressurized air needed to provide powered adjustment, again adding to the bulk. As is known in the art, it can take a substantial amount of time for an air compressor to build up sufficient pressure for a given purpose. Adjusting the landing gear in a reasonably short time is one of the desired outcomes of a powered lift, and thus this is another drawback of such a pneumatic unit. In addition, positioning the drive unit outside the telescoping legs exposes the unit to damage during transport.

BRIEF SUMMARY OF THE INVENTION

The invention provides a landing gear system for a trailer having a pair of vertically adjustable lifts adapted to attach to the trailer; a hydraulic motor having a pair of rotational outputs; and a pair of landing gear drive shafts, each rotationally engaging one of the respective lifts and one of the respective rotational outputs to vertically adjust the lifts.

The invention also provides a landing gear system for a trailer having a pair of vertically adjustable lifts adapted to connect to the trailer; a hydraulic motor having at least one rotational output; a drive shaft extending between and rotationally engaging the pair of lifts to vertically adjust the lifts; and a drive shaft engagement mechanism engaging the at least one rotational output and the drive shaft to transfer rotational motion from the at least one rotational output to the drive shaft.

The invention further provides, in combination, a trailer, a landing gear system for the trailer and a vehicle having an electrical power source and being adapted to connect to the trailer, the system having a pair of vertically adjustable lifts adapted to connect to the trailer; a hydraulic motor having a pair of rotational outputs; a pair of landing gear drive shafts, each rotationally engaging one of the respective lifts and one of the respective rotational outputs to vertically adjust the lifts; and a hydraulic pump in fluid communication with the hydraulic motor and powered by the vehicle electrical power source.

DETAILED DESCRIPTION OF THE INVENTION

Figure 1:
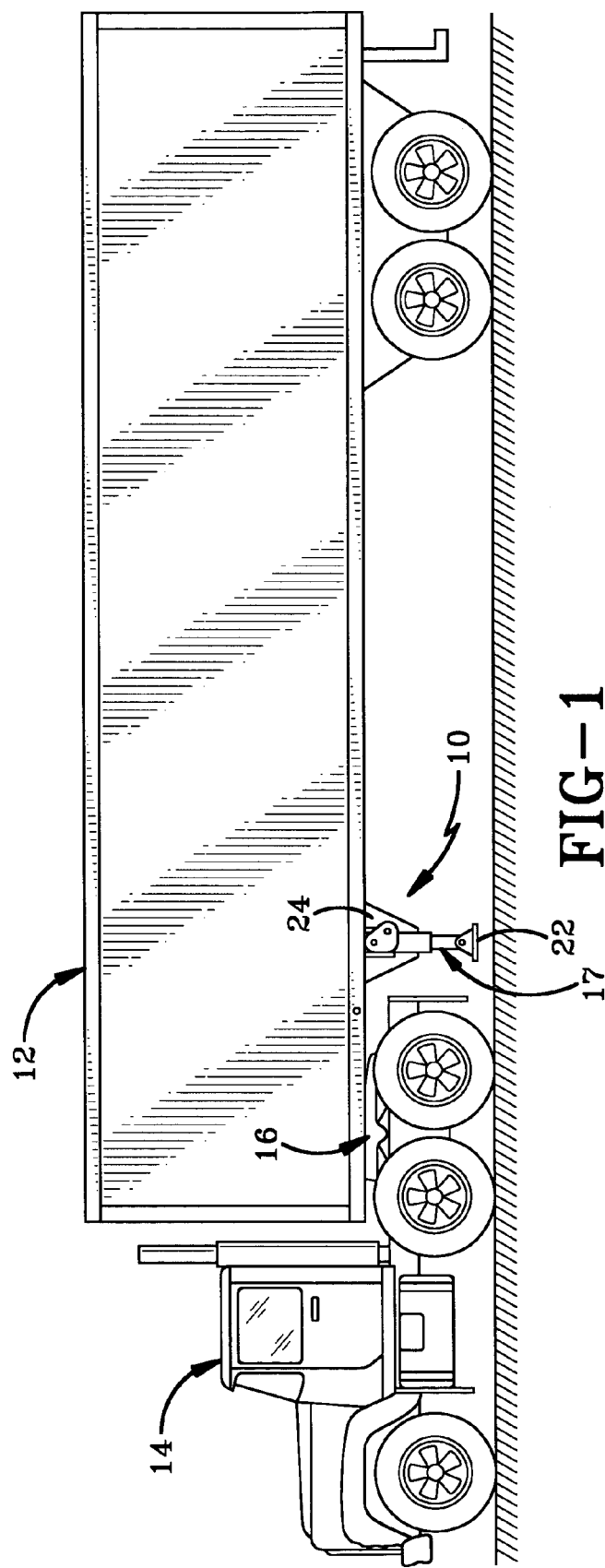
FIG. 1 is a side elevational view of a tractor trailer rig showing the landing gear of the present invention.
Figure 2:
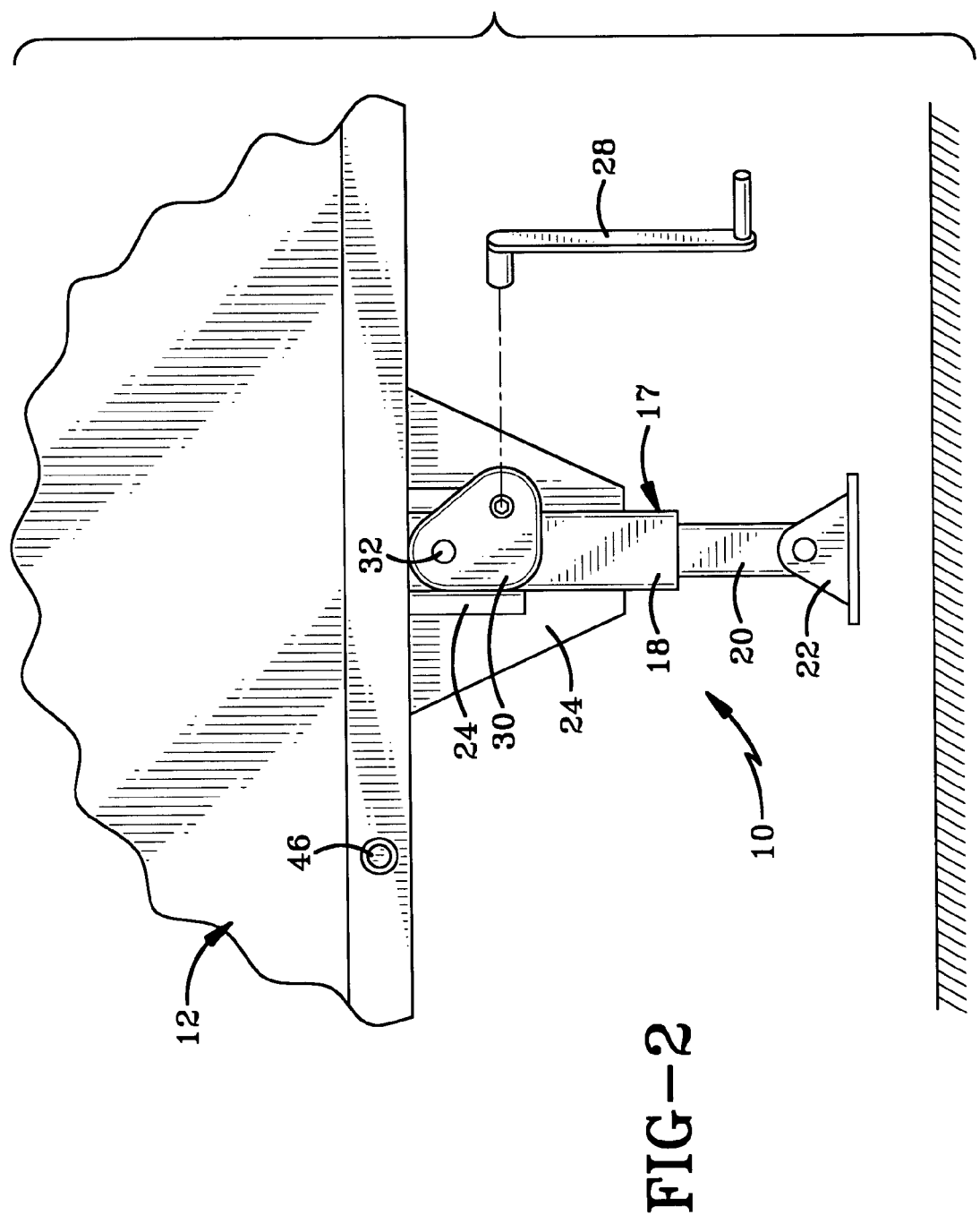
FIG. 2 is a fragmentary enlarged view of the landing gear shown in FIG. 1, in the raised position and showing a hand crank.
Figure 3:
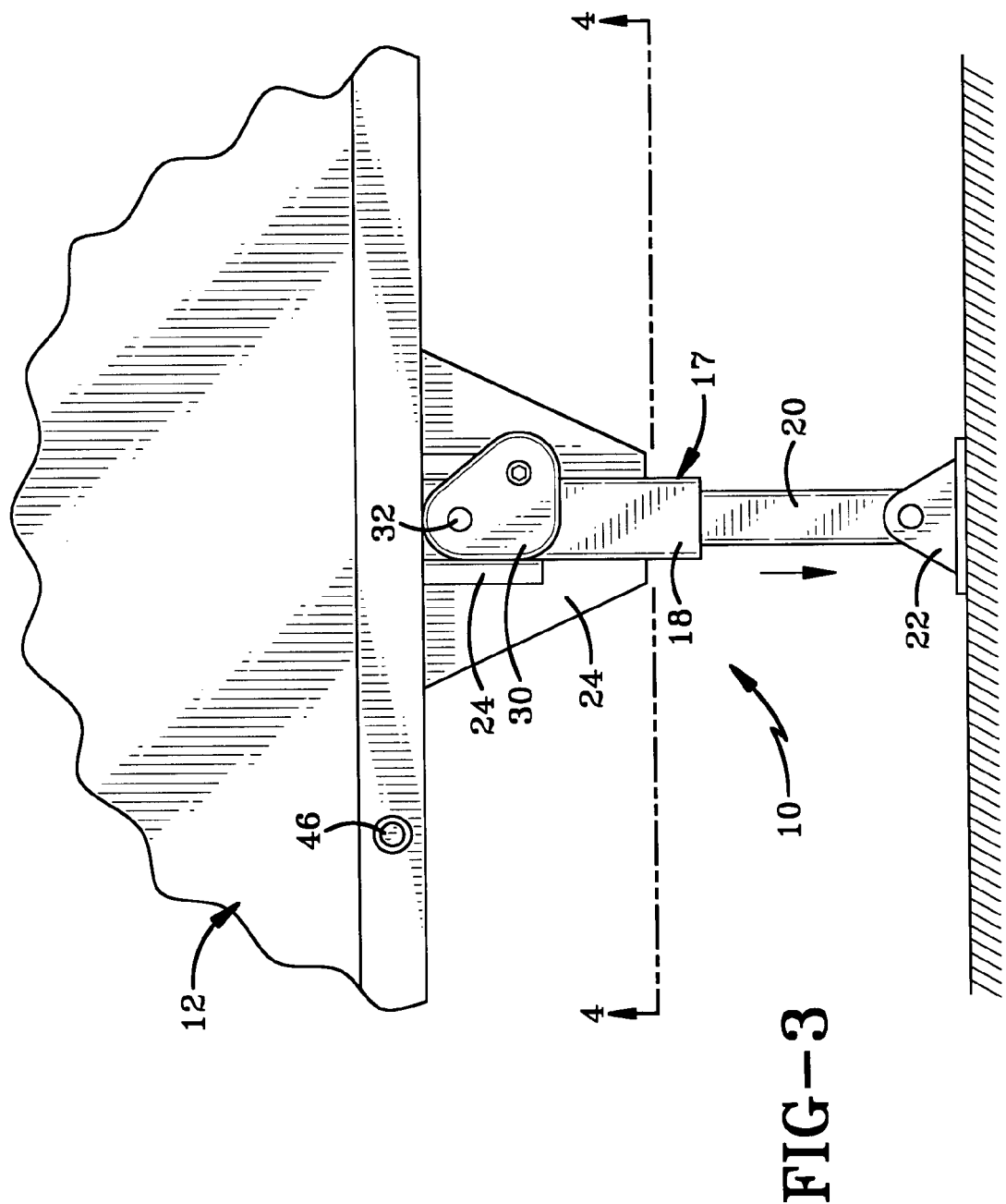
FIG. 3 is similar to FIG. 2 but shows the landing gear in the lowered position.

The vertically adjustable landing gear of the present invention is indicated generally at 10, and is shown particularly in FIGS. 1–5. Landing gear 10 is typically used to raise and lower one end of a trailer 12 (FIG. 1) such as is commonly used with a tractor 14 of a tractor trailer rig and attached thereto by a fifth wheel assembly 16.

Landing gear 10 typically includes a pair of vertically adjustable lifts 17, each having a vertical housing 18 with a telescoping leg 20 vertically adjustably housed therein. A pivotally mounted foot 22 is typically connected to the lower end of leg 20 to provide a platform upon which the landing gear is to rest and typically has some adjustability to allow for either level or inclined surfaces. Landing gear 10 is typically fixed to mounting members 24 (FIG. 2) which are attached to frame members 26 of trailer 12. In order to raise and lower landing gear 10 manually, a hand crank 28 rotationally engages a reduction gear box 30 which rotationally engages a transverse drive shaft 32, as is commonly known in the art. The rotational motion of drive shaft 32 is typically translated by bevel gears (not shown) or the like in order to raise and lower landing gear 10. As a variety of mechanisms exist which translate the rotational motion of drive shaft 32 into motion allowing for the vertical adjustment of landing gear 10, this aspect of landing gear 10 is not shown in particular. Typically, transverse drive shaft 32 is a single shaft extending between and rotationally engaging each vertically adjustable lift 17.

Figure 4:
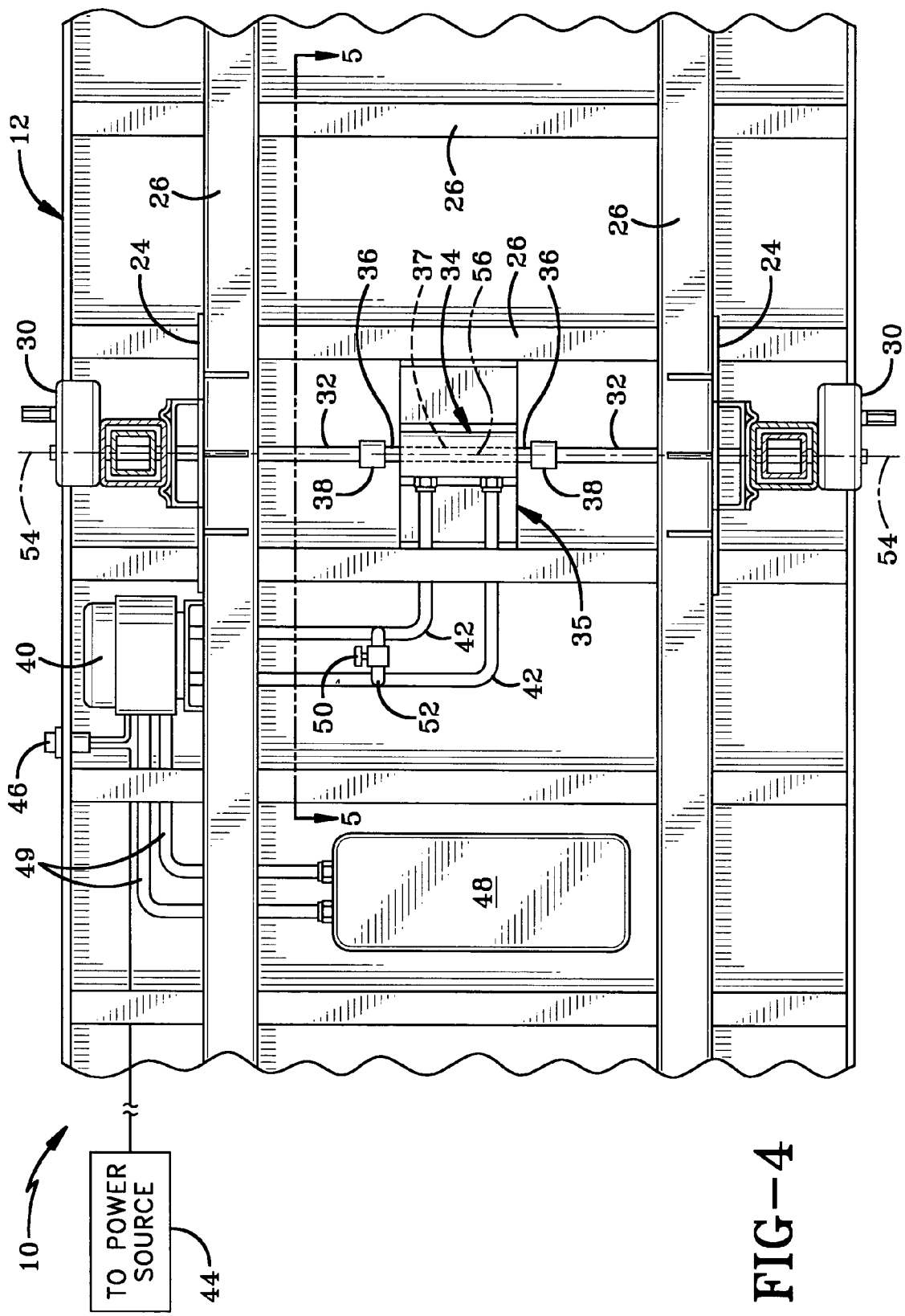
FIG. 4 is a sectional view taken on line 4—4 of FIG. 3.
Figure 5:
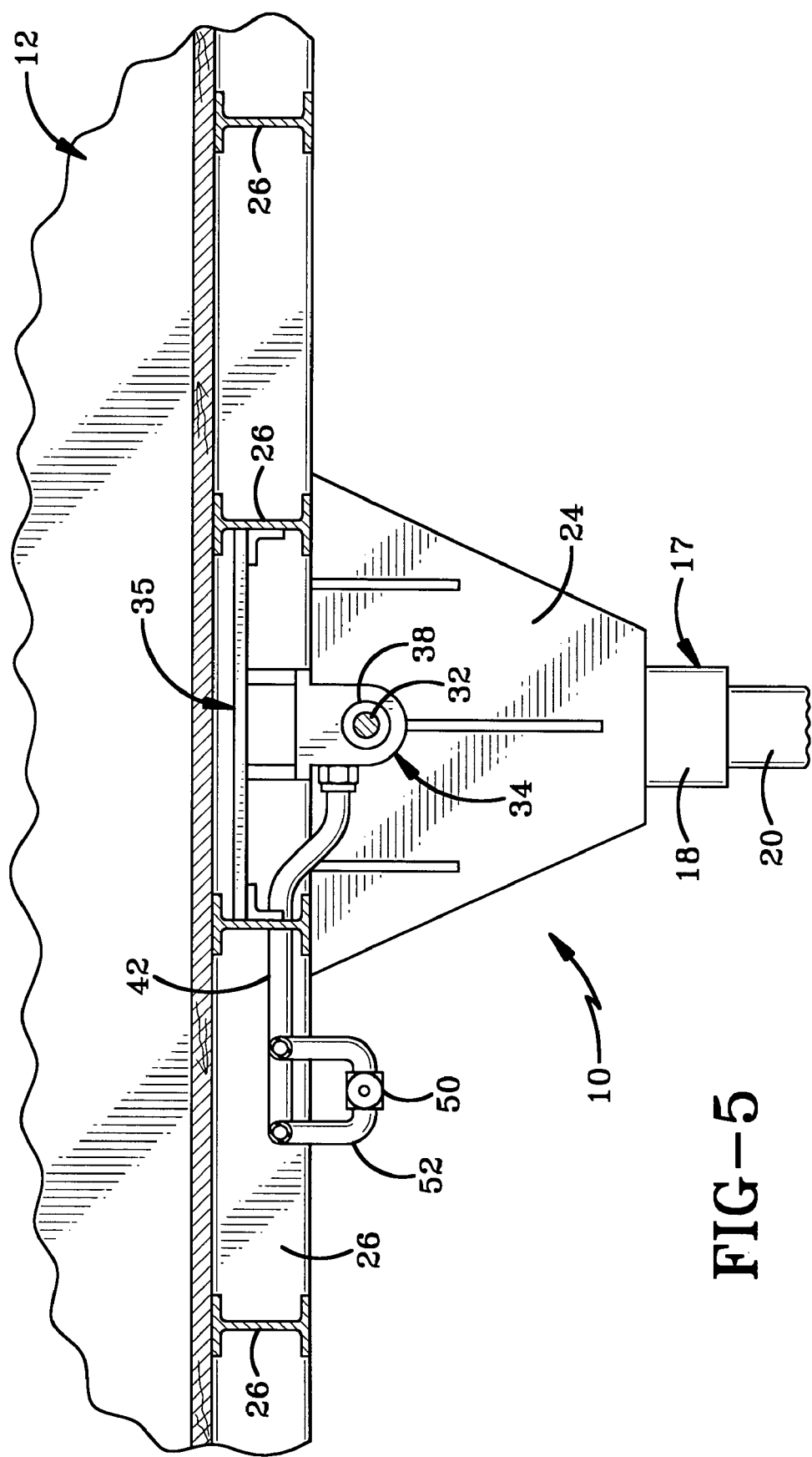
FIG. 5 is a sectional view taken on line 5—5 of FIG. 4.

In accordance with one of the main features of the present invention, transverse drive shaft 32 is split into two pieces or may be referred to as a pair of drive shafts, each of which rotationally engage a dual output hydraulic motor 34 which is mounted via a mounting assembly 35 on frame 26 of trailer 12 (FIG. 4). Such a dual output hydraulic motor is produced by Eaton Corp. of Cleveland, Ohio. Hydraulic motor 34 includes a pair of rotational outputs 36, which are the outwardly protruding ends of a common drive shaft 37 (FIG. 4), each of which is coupled via a coupler 38 to a respective transverse drive shaft 32. Hydraulic motor 34 is in fluid communication with hydraulic pump 40 via pressure/return lines 42. Hydraulic pump 40 is connected to a power source 44, which is typically the electrical system of the vehicle to which the trailer is attached, such as the electrical system of tractor 14. Typically, these systems run on 12 volt or 24 volts D.C. Hydraulic pump 40 is controlled by switch 46, which is electrically connected to pump 40 and power source 44. Hydraulic pump is in fluid communication with a hydraulic reservoir 48 via lines 49. In accordance with another main feature of the present invention, a relief valve 50 is provided on relief line 52 which is selectively in fluid communication with each pressure/return line 42.

In operation, landing gear 10 functions as follows. Switch 46 is used to provide power to hydraulic pump 40 which pumps hydraulic fluid through one of the pressure/return lines 42 to provide the power to operate hydraulic motor 34. Hydraulic fluid is returned to hydraulic pump 40 through the other of pressure/return lines 42. Hydraulic motor 34 provides rotational motion at outputs 36. This rotational motion is translated to drive shafts 32 through couplers 38 to provide the power to operate each lift 17. Each drive shaft 32 has a central longitudinal axis 54 which is substantially coaxial with a central longitudinal axis 56 of drive shaft 37 of hydraulic motor 34. Landing gear 10 thereby provides a pair of drive shafts 32 directly driven by hydraulic motor 34 in order to provide vertical adjustment of lifts 17. To raise lifts 17, hydraulic fluid is pumped through one of lines 42 to rotate drive shafts 37 and 32 in one direction. To lower lifts 17, hydraulic fluid is pumped through the other of lines 42 to rotate drive shafts 37 and 32 in the opposite direction. Switch 46 controls the directional flow of hydraulic fluid from pump 40 to selectively raise and lower lifts 17. In case the hydraulic system malfunctions, pressure relief valve 50 is utilized to relieve pressure on pump 34 to allow drive shaft 37 to "free wheel" or freely rotate, which allows lift 17 to be manually operated by hand crank 28 in the traditional fashion.

Figure 6:
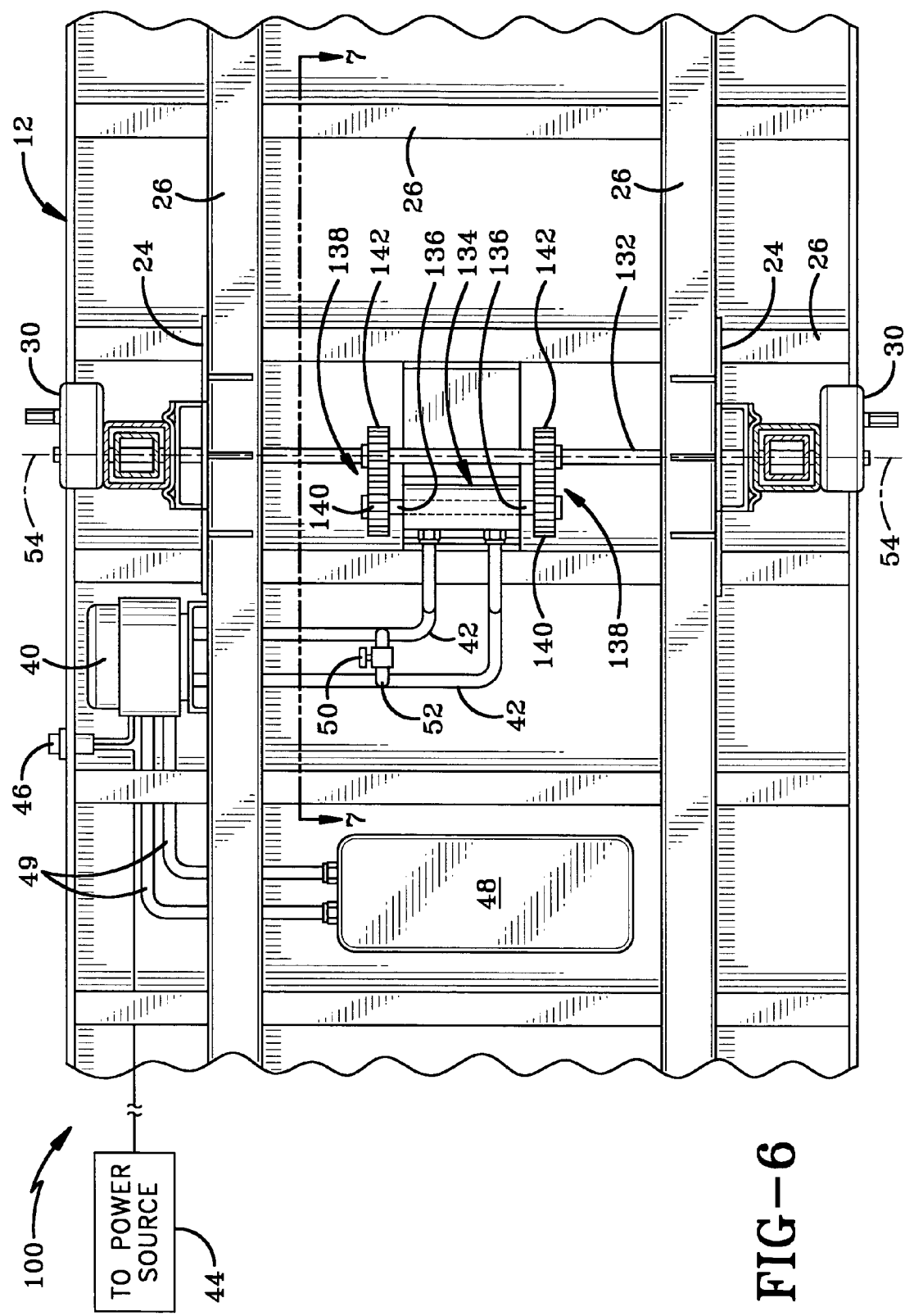
FIG. 6 is a view similar to FIG. 4 of a second embodiment of the present invention.
Figure 7:
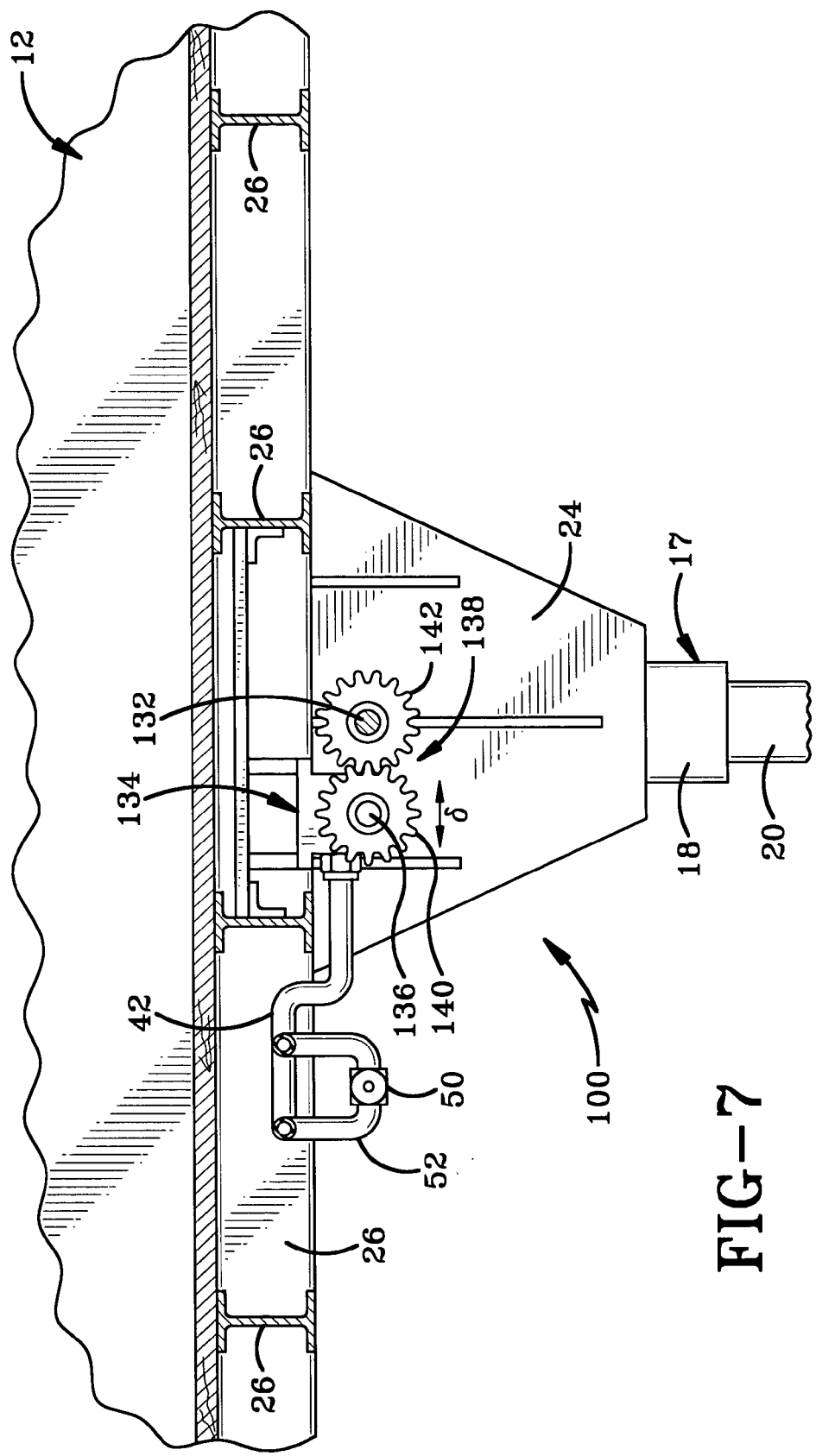
FIG. 7 is a sectional view taken on line 7—7 of FIG. 6.
Figure 8:
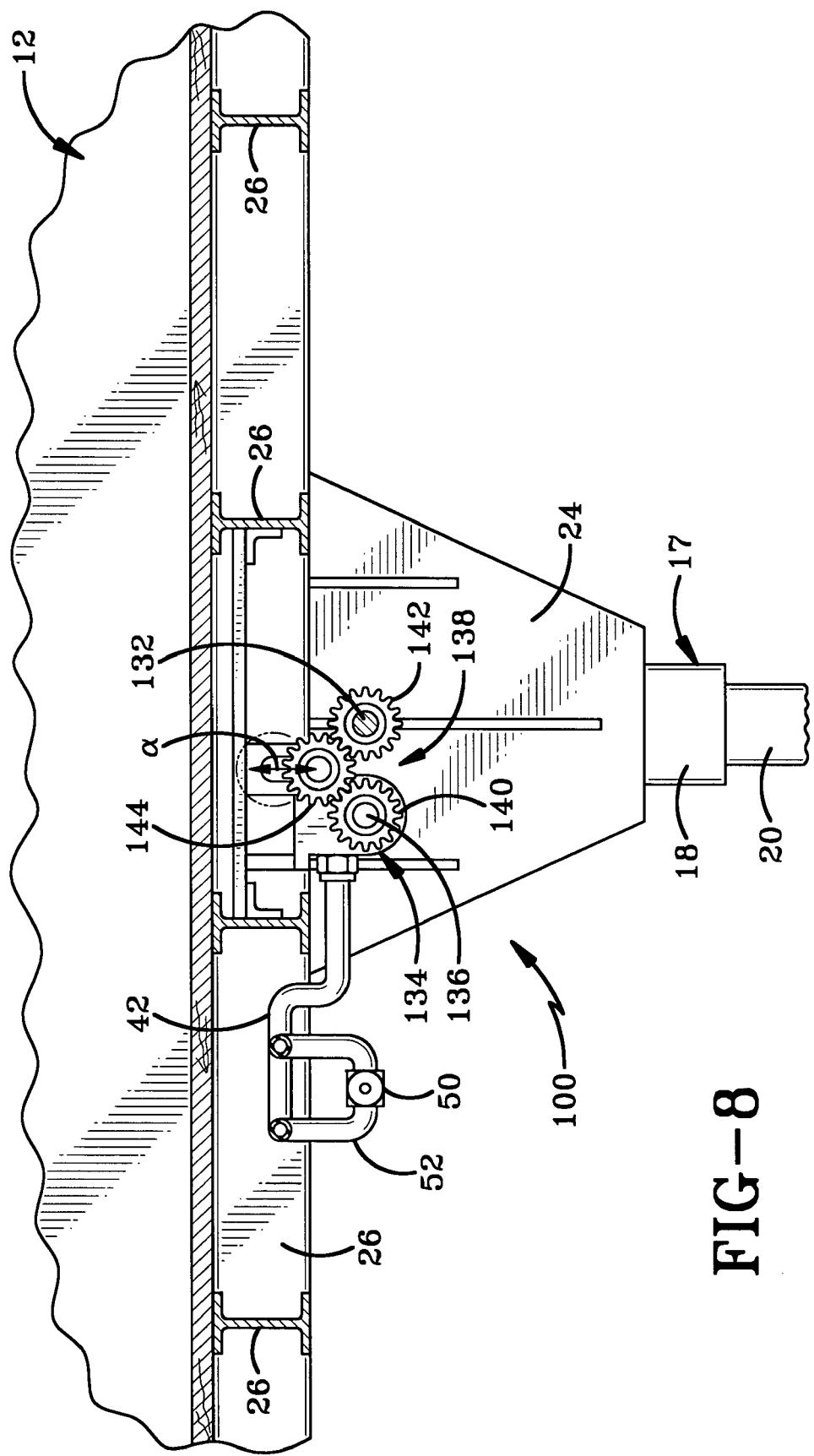
FIG. 8 is a view similar to FIG. 7 including an intermediate gear.

A second embodiment of the present invention is shown generally at 100 in FIGS. 6–8. Landing gear 100 is similar to landing gear 10 except that landing gear 100 has a single landing gear drive shaft 132 which is rotationally driven by a hydraulic motor 134 having either single or dual outputs 136 via a drive shaft engagement mechanism 138. Due to the substantial power of hydraulic motor 134, outputs 136 rotationally engage engagement mechanism 138 to rotate drive shaft 132 without the use of reduction gears. Thus, the ratio of the rotation of rotational output 136 to the rotation of drive shaft 132 is substantially 1:1. Engagement mechanism 138 may take any form which allows rotational output 136 to translate rotational motion to drive shaft 132. Preferably, engagement mechanism 138 includes a gear 140 fixed to rotational output 136 and a gear 142 fixed to drive shaft 132 so that the two gears 140 and 142 are rotationally engaged. Alternately, as shown in FIG. 8, an intermediate gear 144 may engage rotational output gear 140 and drive shaft gear 142 so that rotational output gear 140 indirectly drives drive shaft gear 142 via intermediate gear 144. Optionally, gears 140 and 142 may disengage from one another so as to allow drive shaft 132 to be manually rotated in case of failure of the powered drive system. To this effect, motor 134 may be adjustably mounted to allow movement as indicated by the arrow indicated at 6 in FIG. 7. Alternately, intermediate gear 144 may be disengageable from at least one of output gear 140 and drive shaft gear 142. To this effect, intermediate gear 144 has an engaged position and a disengaged position, shown respectively in FIG. 8 in solid and phantom-lines, with gear 144 moving therebetween as shown by the arrow indicated at a.

In operation, landing gear 100 functions as follows. Hydraulic motor 134 is operated as described in relation to landing gear 10 to provide rotational motion at outputs 136 and gears 140. Referring to FIGS. 6–7, gears 140 rotationally engage gears 142 to rotate gears 142 and drive shaft 132, thereby providing the mechanism to operate lifts 17 as previously described. Alternatively, with reference to FIG. 8, intermediate gear 144 rotationally engages each of gears 140 and 142, thus providing a mechanism of translating rotational motion from gear 140 to gear 142 and shaft 132 without the direct engagement of gears 140 and 142. Thus, gear 140 drives intermediate gear 144, which drives gear 142 and shaft 132. In the case of hydraulic system malfunction, gear 144 may be moved to disengage from either or both of gears 140 and 142 to allow drive shaft 132 to be manually driven by hand crank 28 as described above to raise and lower lifts 17.

Figure 9:
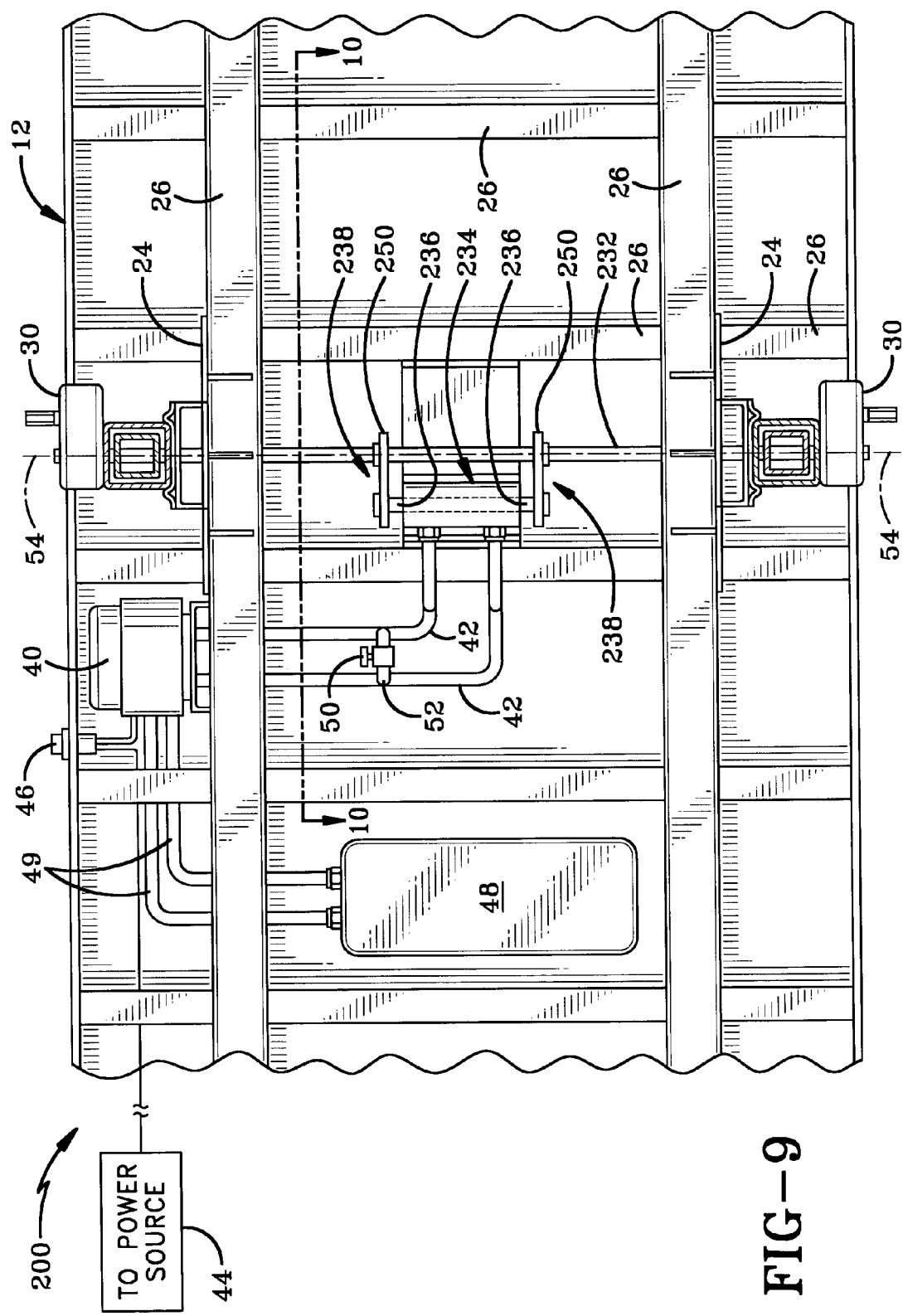
FIG. 9 is a view similar to FIG. 6 of a third embodiment of the present invention.
Figure 10:
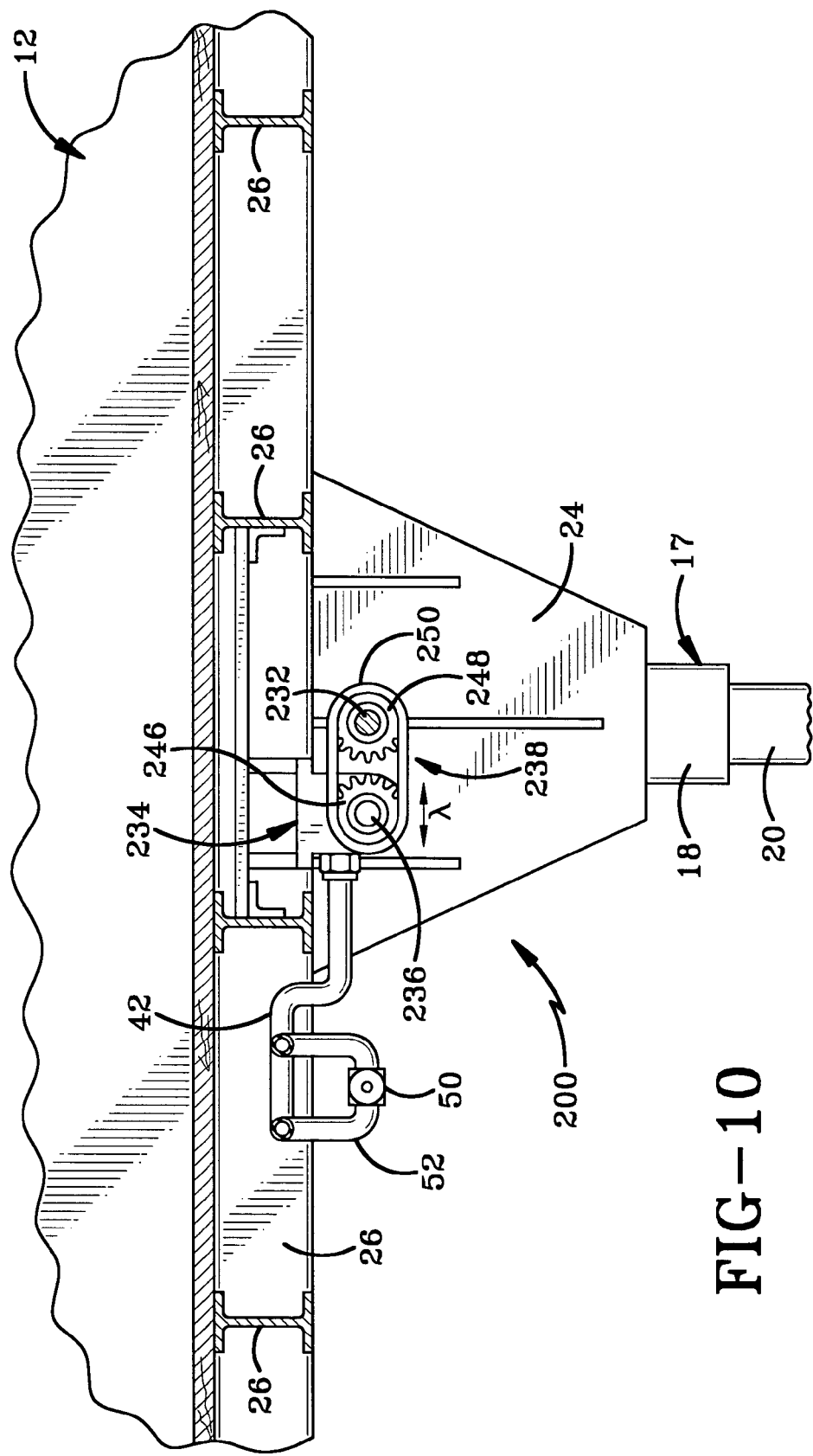
FIG. 10 is a sectional view taken on line 10—10 of FIG. 9.
Figure 11:
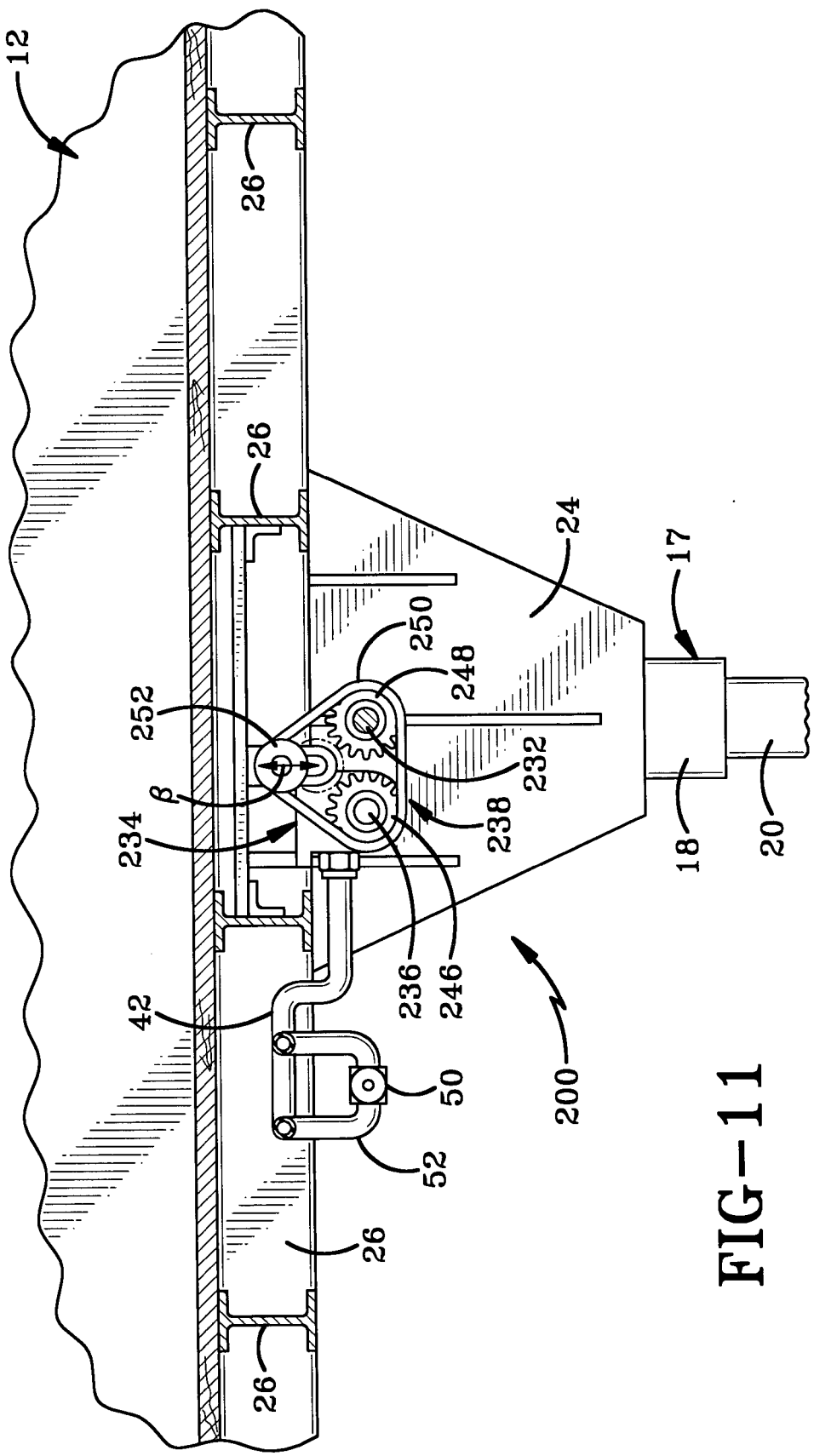
FIG. 11 is a view similar to FIG. 10 including a chain tensioner.

A third embodiment of the present invention is shown generally at 200 in FIGS. 9–11. Landing gear 200 is similar to landing gear 100 except that the engagement mechanism is different. FIG. 10 shows an engagement mechanism 238, which includes a sprocket 246 attached to output 236 of motor 234 and a sprocket 248 attached to drive shaft 232 with a chain 250 engaging each of sprockets 246 and 248. Similar to the second embodiment, engagement mechanism 238 may allow chain 250 to disengage from at least one of sprockets 246 and 248 to permit drive shaft 132 to be manually rotated in case of failure of the hydraulic system. To that effect, motor 234 may be adjustably mounted to allow movement as indicated by the arrow at A in FIG. 10. Alternatively, engagement mechanism 238 may include a chain tensioner 252 (FIG. 11) which can be used to move chain 250 between a tightened position and a loosened position, shown respectively in solid lines and in phantom in FIG. 11, tensioner 252 being selectively moveable between said positions as indicated by the arrow indicated at β. In the tightened position, chain 250 is capable of driving drive shaft 232. In the loosened position, enough slack in chain 250 is created so that chain 250 is removable from at least one of sprockets 246 and 248 in order to allow drive shaft 232 to be manually rotated in case the powered system fails. Chain tensioner 252 may take various forms such as an additional sprocket or a rotatable wheel.

In operation, landing gear 200 functions like landing gear 100 except in regard to the engagement mechanism. Referring to FIGS. 9–10, hydraulic motor 234 provides rotational motion at outputs 236 and sprockets 246, which engage and drive chain 250, which engages and drives sprockets 248 to translate the rotational motion to sprockets 248 and drive shaft 232. The rotation of shaft 232 operates lifts 17 as described above. Alternately, with reference to FIG. 11, tensioner 252 engages chain 250 and is movable between the tightened and loosened positions. In the tightened position, sprocket 246 drives sprocket 248 and shaft 232 via chain 250 as previously noted with the exception of tensioner 252 maintaining sufficient pressure on chain 250 to keep chain 250 in driving relationship between sprockets 246 and 248 to rotate shaft 232. In the loosened position, chain 250 is loose enough to disengage from sprockets 246 and 248 to allow drive shaft 232 to be manually driven by hand crank 28 as previously noted to raise and lower lifts 17.

Thus, the present invention provides a landing gear which is powered by a hydraulic motor sufficiently powerful to directly rotate the landing gear drive shaft without reduction gears to raise and lower the lifts. In the preferred embodiment, this is achieved with a dual-output hydraulic motor having a drive shaft substantially aligned with the landing gear drive shaft which rotates to operate the lifts. Alternately, a single- or dual-output hydraulic motor drives the landing gear drive shaft without reduction gears via an engagement mechanism comprising either sets of gears or a sprocket-chain assembly.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

What is claimed is:

1. A landing gear system for a trailer comprising:
   a pair of vertically adjustable lifts adapted to attach to the trailer;
   a hydraulic motor having a pair of rotational outputs extending outwardly directly therefrom; and
   a pair of landing gear drive shafts, each rotationally engaging one of the respective lifts and one of the respective rotational outputs to vertically adjust the lifts.

2. The system of claim 1 wherein each rotational output rotates at a substantially equal rate to vertically adjust the lifts at substantially the same rate.

3. The system of claim 1 wherein the hydraulic motor further includes a drive shaft to which each rotational output is connected.

4. The system of claim 3 wherein the drive shaft and rotational outputs are formed as an integral one piece member.

5. The system of claim 1 wherein the hydraulic motor is mounted on the trailer.

6. The system of claim 1 wherein the landing gear drive shafts each have a longitudinal axis and the rotational outputs each have a longitudinal axis substantially coaxial with the longitudinal axes of the drive shafts.

7. The system of claim 1 further comprising a relief valve to relieve hydraulic pressure from the hydraulic motor to allow manual rotation of the drive shafts and rotational outputs to vertically adjust the lifts.

8. The system of claim 1 further comprising a hydraulic pump in fluid communication with the hydraulic motor.

9. The system of claim 8 wherein the hydraulic pump is electrically powered.

10. In combination, a trailer, a landing gear system for the trailer and a vehicle having an electrical power source and being adapted to connect to the trailer, the landing gear system comprising:
    a pair of vertically adjustable lifts adapted to connect to the trailer;
    a hydraulic motor having a pair of rotational outputs extending outwardly directly therefrom;
    a pair of landing gear drive shafts, each rotationally engaging one of the respective lifts and one of the respective rotational outputs to vertically adjust the lifts; and
    a hydraulic pump in fluid communication with the hydraulic motor and powered by the vehicle electrical power source.

11. The system of claim 1 wherein the hydraulic motor has a housing from which the rotational outputs project.

12. The system of claim 11 wherein the rotational outputs project respectively from opposite sides of the hydraulic motor housing.

13. The system of claim 1 wherein the system is free of an adapter for translating rotational output of the hydraulic motor to the landing gear drive shafts.

14. The system of claim 1 wherein the system is free of gears for translating rotational movement of the rotational outputs to the landing gear drive shafts.

15. The system of claim 1 wherein the system is free of chains and sprockets for translating rotational movement of the rotational outputs to the landing gear drive shafts.

16. The system of claim 1 wherein the ratio of rotation of each rotational output to rotation of each respective landing gear drive shaft is 1:1.

17. The system of claim 1 wherein the system is free of a reduction gear mechanism to translate rotational output of the hydraulic motor to rotation of the drive shafts.

18. The system of claim 1 wherein each landing gear drive shaft is connected directly to the respective rotational output of the hydraulic motor via a coupler.

19. The system of claim 1 wherein the hydraulic motor is disposed directly between the landing gear drive shafts.

20. The system of claim 1 wherein the hydraulic motor is mounted on the trailer via a mounting assembly free of moving parts.

21. The system of claim 10 wherein there is a connection between each landing gear drive shaft and the respective rotational output; and wherein the connection is free of gears.

22. The system of claim 10 wherein there is a connection between each landing gear drive shaft and the respective rotational output; and wherein the connection is free of sprockets.

23. The system of claim 10 wherein there is a connection between each landing gear drive shaft and the respective rotational output; and wherein the connection is free of chains.

24. A landing gear system for a trailer comprising:

a pair of vertically adjustable lifts adapted to attach to the trailer;

a hydraulic motor having opposed sides;

a pair of rotational outputs projecting respectively from the opposed sides of the hydraulic motor; the rotational outputs being rotatable about a common axis; and a pair of landing gear drive shafts each rotatable about the common axis of the rotational outputs and each being selectively rotationally driven by one of the respective rotational outputs to vertically adjust the lifts.

* * * * *